(12) United States Patent
Mok et al.

(10) Patent No.: US 7,668,210 B1
(45) Date of Patent: Feb. 23, 2010

(54) METHOD AND APPARATUS FOR REDUCING CURRENT DEMAND VARIATIONS IN LARGE FAN-OUT TREES

(75) Inventors: Winston Ki-Cheong Mok, Vancouver (CA); Scott A. Muma, Saskatoon (CA); Nicholas W. Rolheiser, Saskatoon (CA)

(73) Assignee: PMC-Sierra, Inc., Santa Clara, CA (US)

( * ) Notice: Subject to any disclaimer, the term of this patent is extended or adjusted under 35 U.S.C. 154(b) by 1435 days.

(21) Appl. No.: 10/830,031

(22) Filed: Apr. 23, 2004

Related U.S. Application Data

(60) Provisional application No. 60/464,855, filed on Apr. 24, 2003.

(51) Int. Cl.
    *H04J 3/04* (2006.01)
(52) U.S. Cl. ..................... 370/542; 370/532
(58) Field of Classification Search .............. 370/449, 370/329, 348, 395, 389, 472, 468, 535, 477, 370/537, 358, 533, 532, 542
See application file for complete search history.

(56) References Cited

U.S. PATENT DOCUMENTS

| | | | |
|---|---|---|---|
| 5,390,333 A | 2/1995 | Pritt et al. | |
| 5,446,852 A | 8/1995 | Hilpert et al. | |
| 5,990,730 A | 11/1999 | Shinozaki | |
| 6,119,199 A | 9/2000 | Isobe | |
| 6,243,779 B1 | 6/2001 | Devanney et al. | |
| 6,771,655 B1 * | 8/2004 | O'Loughlin et al. | ......... 370/449 |
| 7,209,477 B2 * | 4/2007 | Pike | ......................... 370/360 |

\* cited by examiner

*Primary Examiner*—Brenda Pham
(74) *Attorney, Agent, or Firm*—Mukundan Chakrapani; Borden Ladner Gervais LLP

(57) ABSTRACT

A method and apparatus are provided for reducing current demand variations in large fanout trees. The fanout tree is split into at least 2 sub-groups, each preferably with substantially equal parasitic capacitance. Data is then scrambled according to a scrambling sequence function to provide scrambled data having a constant number of bits that are toggled with respect to time, such as when observed in pairs of sub-groups. Functionally, an apparatus according to an embodiment of the present invention includes 3 blocks: a scrambler, egress logic, and a de-scrambler. The egress logic is simply a block of storage that can reorder the bytes received from the scrambler. The de-scrambler de-scrambles the retransmitted data based on the scrambling sequence function. Embodiments of the present invention can be applied to any system where data must fanout from a single source to many destinations, such as switches.

36 Claims, 11 Drawing Sheets

CM: Connection Memory

| Timeslots 1-48 | Timeslots 49-96 | Timeslot 97 | Timeslots 98-144 | Timeslots 144-4320 |
|---|---|---|---|---|
| A1 ('hF6) | A2 ('h28) | J0 ('h??) | Z0 ('h00) | Payload |
| | | | | Payload |
| | | | | Payload |
| H1 | H2 | H3 | H3 | Payload |
| | | | | Payload |
| | | | | Payload |
| | | | | Payload |
| | | | | Payload |
| | | | | Payload |

METHOD AND APPARATUS FOR REDUCING CURRENT DEMAND VARIATIONS IN LARGE FAN-OUT TREES

CROSS REFERENCE TO RELATED APPLICATIONS

This application claims the benefit of U.S. Provisional Application No. 60/464,855, filed Apr. 24, 2003, which is incorporated herein by reference.

FIELD OF THE INVENTION

The present invention relates generally to any application that needs to broadcast data to a large number of destinations. More particularly, the present invention relates to methods and apparatus having large fan-out trees from an ingress point to a plurality of egress points.

BACKGROUND OF THE INVENTION

Time division multiplexing (TDM) is a method of putting multiple data streams at a lower rate into a single higher rate signal by separating the higher rate signal into N time segments. The circuit that combines signals at the source (transmitting) end of a communication link is known as a multiplexer. It accepts the input from N lower rate signals, breaks each signal into segments, and assigns the segments to the higher rate signal in a rotating, repeating sequence. The frequency of the higher rate signal is N times the frequency of the lower rate signal. At the other end of the link, the individual signals are separated out by means of a circuit called a demultiplexer. The demultiplexer regenerates each lower rate signal by extracting one segment from every N segments of the higher rate signal using the same rotating, repeating sequence used by the multiplexer. A two-way communication link requires a multiplexer/demultiplexer at each end of the link.

The Synchronous Optical Network (SONET1) and Synchronous Digital Hierarchy (SDH2) standards are two examples of TDM. In SONET, the base signal rate is 51.84 Mbps and is referred to as a STS-1 signal. Forty-eight STS-1 signals are multiplexed to form an STS-48 signal and 192 STS-1 signals are multiplexed to form an STS-192 signal and so on. The SDH standard defines a similar signal hierarchy.

Time division multiplexed switches are commonly used to cross-connect lower rate signals that are contained within a higher rate signal. The lower rate signal will be referred to as a grain. The collection of lower rate signals (i.e. grains) that form a higher rate signal is referred to as a grain group. A grain group is therefore composed of a fixed number of grains.

FIG. 1 illustrates aligned TDM channels ready for switching. In a TDM channel, data is multiplexed according to location in time. Each port in a system must be aligned to a common signal. In SONET, the alignment signal is an 8 kHz start of frame signal. A stream within a channel is identified by its offset from the signal, with an individual datum recurring every G clock ticks. The grain group size G defines the granularity of switching possible in a particular TDM system. Therefore, a data value belonging to a given channel is present every G clock ticks with each clock tick often referred to as a time slot. For example, one sample from a STS 1 signal forms each grain of SONET system. An STS-48 signal is formed from 48 such grains, and therefore, the grain group size is 48.

FIG. 2 illustrates TDM switching. In general, a switch can be any number of inputs to any number of outputs. For illustrative purposes, only switches of N inputs and N outputs (N×N) are considered herein, but the invention can be easily extended to asymmetrical switches of various numbers of input and output ports. In FIG. 2, bytes are labelled with a letter representing the input port and a number representing the byte position at the port. As can be seen in the output, bytes may be reordered to any position, may be multicast to several ports (or a single port), and bytes may be dropped. The figure shows switching of grains within a single grain group. The same switching of grains within a grain group occurs for all grain groups.

FIG. 3 illustrates the conceptual implementation of an N×N memory switch 10. Two memories 12, 14 are required with each memory having N write ports and N read ports. Ingress ports 16 write a grain group to one memory while egress ports 18 read a grain group from the other memory. The specific memory written to or read from alternates at every grain group. The ingress ports 16 write data into memory at an address that is indexed by the ingress port and timeslot numbers of the ingress grains. The egress ports 18 read data from the memory location containing the desired ingress grains thereby achieving the switching of ingress data to egress ports. The read address of the egress ports is defined by a connection memory that is configured by the user.

However, it is not practical to build fast memories with more than 3 or 4 ports. An alternative but functionally equivalent implementation of the memory switch of FIG. 3 is the output buffered switch of FIG. 4. Output buffered switch 20 implements data storage at each egress port 28 with connection memory controlled multiplexing selecting the ingress grains to store.

A major disadvantage of output buffered switch architectures is the need to connect each input to a large number of destinations. The destinations are the storage elements within each egress port and are multiplied by the number of egress ports. For large N, the wiring and the input gate capacitance of the logic circuits constitute a large set of parasitic capacitors. When the data changes from one clock cycle to the next, these capacitors must be charged and discharged. The current needed to charge and discharge the parasitic capacitors must be supplied by the external power supply. In a large TDM switch the current demand can be very large, in the order of 100 Amperes and lasts for only a short period of time. The magnitude of this current spike is proportional to the number of data bits that change state from logic high to logic low or vice versa, from one clock cycle to the next. Thus, the current demand can vary from zero, in the case where the data is constant, to maximum, in the case where all the data bits toggle.

FIG. 5 illustrates a model of a TDM switch with an external power supply. The TDM switch 30 is modeled by a variable current source (Isw) with demand profiles that vary with the changes in data, and an on-chip filtering capacitor (Csw). The power supply 32 is modeled by an ideal voltage source (Vs), an output resistance (Rs) and an inductor (Ls). The inductor models the inability of the power supply to rapidly change its current output. The capacitor (Cb) represents the PC board filtering capacitors. Parasitic inductances on the PC board are represented by the inductor (Lb).

FIG. 6 illustrates a SONET STS-48 frame, or equivalently an SDH STM-16 frame. Consider the framing bytes A1 and A2, the section trace byte J0 and the National use bytes Z0 (formerly C1 bytes). The prefix <'h> (without the angled brackets) before a value will be used herein to represent a hexadecimal number or value. The A1 bytes have a constant value of 'hF6, while the A2 bytes have a constant value of 'h28. The J0 byte is arbitrary. The Z0 bytes tend to be all-zeros in many applications. The payload bytes are assumed to have random data. From a current demand point of view, there would be no current needed to charge and discharge parasitic capacitors during the A1, A2 and Z0 bytes. There would be isolated current spikes at the A1 to A2 transition, the A2 to J0 transition and the J0 to Z0 transition. During the Payload bytes, the current demand would be at a statistical average level due to the random nature of the data.

FIG. 7 illustrates the voltage at point A of FIG. 5. During the times when payload bytes are delivered to the TDM switch, the number of transitions in the data would average to 4 bits for every byte. Consequently, the voltage at point A would settle to an average value. As one enters the 48 A1 byte times, the current demand for charging and discharging the data fanout tree would fall to zero. Since the power supply can only react very slowly to the drop in current demand, capacitor Cb would charge up and the voltage at point A rises. Similarly, the voltage would continue to rise during the A2 and Z0 byte times because of the low current demands. At the transitions between A1 and A2 bytes, the data undergoes 6 bits of changes per byte ('hF6 XOR 'h28='b11011110). Due to parasitic inductances and capacitances on the PC board, this isolated current spike leads to a voltage spike and ringing at the point A of FIG. 5. Similar voltage behaviour is also observable around the J0 byte. When random payload data resumes, the current demand returns to the average value and Cb discharges. Voltage variations can adversely affect sensitive analog circuits inside the TDM switch and in other devices residing on the same PC board. Sharp current and voltage spikes are a source of electromagnetic interference (EMI) in equipment, which needs to be squelched, as much as possible.

Telecommunication systems typically have a maximum power budget for printed circuit boards of between 100 W and 120 W. In a switch fabric card, the TDM switch component often consumes the majority of that power. These components may generate current demand spikes that are up to 100 Amperes in amplitude, and are only nanoseconds in duration. It is very expensive and complex to implement power supply systems that can both deliver the large amount of power and react to such rapid current demand changes. Typical output buffered memory switches generally have very large data fanout counts, and every ingress grain from every ingress port is forwarded to each egress port where it may be selected for output.

Known pseudo-random scramblers, or such scrambling methods, can provide a statistical bound that the number of toggled bits tends towards an average value. Pathological data patterns can mimic the scrambler leading to long periods of very high or very low toggled bits over time, and consequently periods with variations in current demand. Methods to reduce overall current demand, such as sending the true or complement form of the data, depending on which has lower transitions, are also statistical in nature. For example, when a consecutive sequence of ingress data bytes have the same value, the data would not be modified. Consequently, current demand would be at zero and the voltage would rise. When data resumes, and only 4 bits changed, there will also be no reason to modify the data. One would again get a current spike or one-half the maximum unmanaged amplitude. At the opposite end of the scale, there are techniques that maintain the current demand at maximum using dummy loads, for example. These tend to be more successful in reducing variations in current demands from cycle to cycle, but at a cost of doubling the total power consumption.

It is, therefore, desirable to provide an implementation of a switch that is capable of handling the large variations in current demands, and has improved performance within the limitations of a power supply system.

SUMMARY OF THE INVENTION

A method and apparatus are described for reducing or eliminating the cycle to cycle variations in power supply current demands in a time division multiplexed memory switch. The control method permits the implementation of memory switches with a large aggregate throughput that would otherwise be limited by the limitations of the power supply system to cope with large variations in current demands. Embodiments of this invention may be employed with any type of switch or device that requires fanout of data from a root node to a large number of leaf nodes.

The method disclosed is important for the practical design of memory switches that do not exceed the capabilities of practical power supply systems. The method disclosed is also useful in other applications that have high fanouts.

The invention can be applied to any system where data must fanout from a single source to many destinations.

It is an object of the present invention to obviate or mitigate at least one disadvantage of previous memory switches.

In a first aspect, the present invention provides a data transmission apparatus, such as a memory switch, having ingress and egress ports, and including a scrambler for splitting a fanout of ingress data, from each ingress port to the egress ports, into a first sub-group and a second sub-group. The scrambler scrambles the first and second sub-groups according to a scrambling sequence function to provide a combined scrambled output of the first and second sub-groups having a constant number of toggled bits with respect to time.

The first and second sub-groups can have substantially equal parasitic capacitance. The scrambling sequence function can include first and second scrambling patterns for scrambling the first and second sub-groups, respectively. When the ingress data is time division multiplexed (TDM) data, the first and second scrambling patterns can each have a bit width equal to a grain bit width of the ingress data. The first and second scrambling patterns can each have a length of 2 scrambling elements, and the constant number of toggled bits can be equal to half the number of sub-groups.

According to an embodiment, the scrambler can further include ingress port logic for splitting the ingress data into a plurality of groups, a first group including the first and second sub-groups, and a second group including third and fourth sub-groups. In such a case, the scrambler scrambles the third and fourth sub-groups according to a second scrambling sequence function to provide a combined scrambled output of the third and fourth sub-groups having a second constant number of toggled bits with respect to time. The third and fourth sub-groups can have substantially equal parasitic capacitance.

The constant number of toggled bits can be made independent of the ingress data. The scrambler can scramble the first and second sub-groups according to the scrambling sequence function to provide a first sub-group scrambled output and a second sub-group scrambled output.

The scrambler can further include a counter for counting timeslots in the ingress data, and a plurality of XOR gates for scrambling the ingress data in response to an output of the counter, to provide the first and second sub-group scrambled outputs. The scrambler can also include first and second sub-group interleavers for providing the first and second sub-group scrambled outputs, respectively.

According to another embodiment, the data transmission apparatus can include egress logic for receiving and retransmitting scrambled data received from the scrambler. The egress logic can include first and second sub-group egress selection switches for receiving and retransmitting first and second sub-group scrambled outputs, respectively, from the scrambler. The egress logic can retransmit scrambled data such that it reorders the scrambled data. The egress logic can also retransmit scrambled data such that it changes the timing of the scrambled data and transfers an identifier of the scrambling sequence function.

According to a further embodiment, the data transmission apparatus includes a de-scrambler for receiving scrambled data, and for de-scrambling the scrambled data based on the scrambling sequence function. The de-scrambler can include a first sub-group descrambler and a second sub-group descrambler, for descrambling the first subgroup and second sub-group, respectively. The de-scrambler can de-scramble the retransmitted data based on a scrambling sequence function identifier, such as: an ingress timeslot number, an egress group number, and a sub-group identifier. The de-scrambler can selectively de-scramble the first-sub group and the second sub-group of an egress port group in response to a configuration signal. The de-scrambler can include a first AND gate coupled to first XOR gates for descrambling the first sub-group, and a second AND gate coupled to second XOR gates for descrambling the second sub-group. The de-scrambler can also include a counter for determining the scrambling sequence function.

In another aspect, the present invention provides a method of transmitting data in a memory switch having ingress and egress ports, including the following steps: splitting a fanout of ingress data, from each ingress port to the egress ports, into a first sub-group and a second sub-group; and scrambling the first and second sub-groups according to a scrambling sequence function into first and second scrambled data, respectively, the first and second scrambled data, when considered together, having a constant number of bits that are toggled with respect to time. The first and second sub-groups can have substantially equal parasitic capacitance.

The step of scrambling the first and second sub-groups according to the scrambling sequence function can include scrambling the first and second sub-groups according to first and second scrambling patterns, respectively. When the ingress data is time division multiplexed (TDM) data, the first and second scrambling patterns can each have a bit width equal to a grain bit width of the ingress data. The first and second scrambling patterns can each have a length of 2 scrambling elements, and the constant number of toggled bits can be equal to half the number of sub-groups.

The step of splitting the fanout of ingress data can include splitting the ingress data into a plurality of groups, a first group including the first and second sub-groups, and a second group including third and fourth sub-groups. In that case, the method further comprises the step of scrambling the third and fourth sub-groups according to a second scrambling sequence function to provide a combined scrambled output of the third and fourth sub-groups having a second constant number of toggled bits with respect to time. The third and fourth sub-groups can have substantially equal parasitic capacitance.

The constant number of toggled bits can be independent of the ingress data. The step of scrambling the first and second sub-groups according to the scrambling sequence function can provide a first sub-group scrambled output and a second sub-group scrambled output. The method can further include the step of de-scrambling the retransmitted data based on the scrambling sequence function.

In a further aspect, the present invention provides a scrambler for use with a data transmission apparatus having ingress and egress ports. The scrambler includes ingress logic for splitting a fanout of ingress data, from each ingress port to the egress ports, into a first sub-group and a second sub-group. The scrambler also includes scrambling logic for scrambling the first and second sub-groups according to a scrambling sequence function to provide a combined scrambled output of the first and second sub-groups having a constant number of toggled bits with respect to time.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
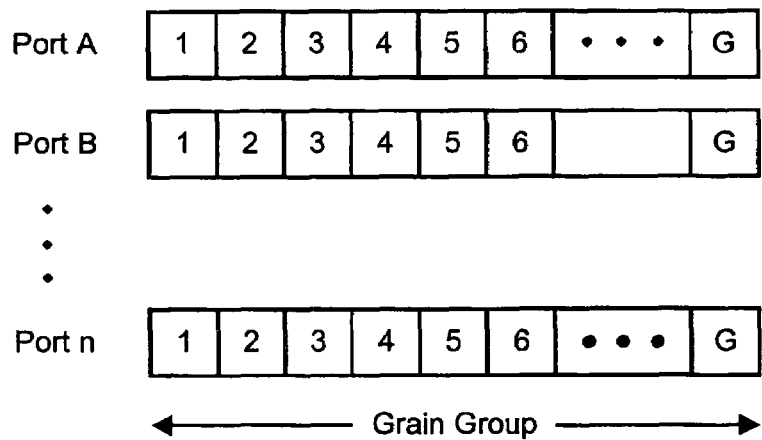
FIG. 1 illustrates aligned TDM channels ready for switching.
Figure 2:
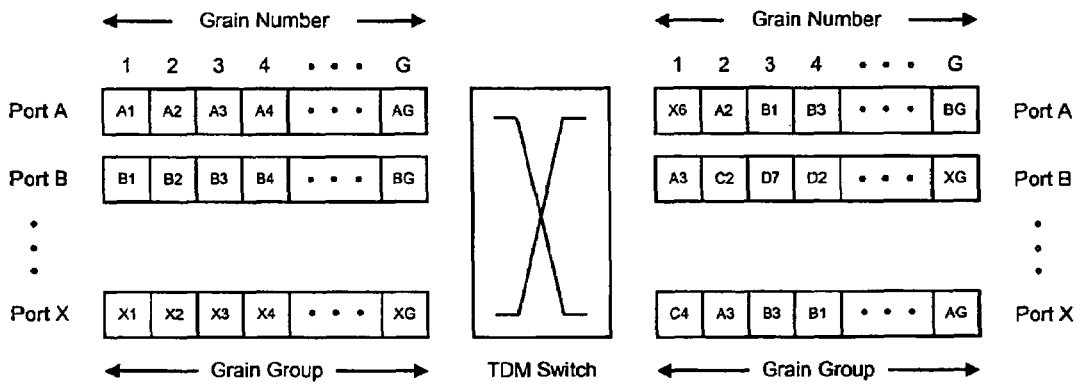
FIG. 2 illustrates TDM switching.

Generally, the present invention provides a method and apparatus for reducing current demand variations in large fanout trees. The fanout tree is split into at least 2 sub-groups, each preferably with substantially equal parasitic capacitance. Data is then scrambled according to a scrambling sequence function to provide scrambled data having a constant number of bits that are toggled with respect to time, such as when observed in pairs of sub-groups. Functionally, an apparatus according to an embodiment of the present invention includes 3 blocks: a scrambler, egress logic, and a de-scrambler. The egress logic is simply a block of storage that can reorder the bytes that come in from the scrambler. The de-scrambler de-scrambles the retransmitted data based on the scrambling sequence function. Embodiments of the present invention can be applied to any system where data must fanout from a single source to many destinations, such as switches.

The term "ingress" as used herein represents an entrance point, or location, or a device to facilitate entrance. For example, in telecommunications, an ingress router is a router through which a data packet enters a network from another network. Similarly, the term "egress" as used herein represents an exit point, or location, or a device to facilitate exiting or going out. For example, in telecommunications, an egress router is a router through which a data packet leaves one network for another network. These terms are largely used herein in relation to ports in a memory switch, and to the entrance and exit of TDM bits or bit groups.

The term "fanout" as used herein represents a situation wherein a particular input point fans-out, or distributes, its output to a plurality of output points. Typically, these output points can be logic gates, ports, or any other physical or logical device. A quantification of the fanout can be the number of output points, or egress points, that are connected to the input point, or ingress point. This can have a practical limit based on the inherent characteristics of the devices being interconnected.

The term "grain" as used herein represents a lower rate signal in a TDM switch. Time division multiplexed switches are commonly used to cross-connect lower rate signals that are contained within a higher rate signal. The term "grain group" as used herein represents the collection of lower rate signals (i.e. grains) that form a higher rate signal in a TDM switch. A "grain group" is therefore composed of a fixed number of "grains".

The prefix <'h> before a value (without the angled brackets) will be used herein to represent the fact that the value that follows is a hexadecimal number or value.

A method and apparatus are described herein for eliminating the cycle to cycle variations in power supply current demands in a time division multiplexed memory switch. The control method permits the implementation of memory switches with a large aggregate throughput that would otherwise be limited by the limitations of the power supply system to cope with large variations in current demands. Embodiments of this invention may be employed with any type of switch or device that requires fanout of data from a root node to a large number of leaf nodes.

Embodiments of the present invention describe a method of implementing the power supply current management apparatus with a buffered memory switch, or similar apparatus, such as an egress selection switch (ESS) architecture described in co-pending and commonly assigned United States Patent Application filed on Mar. 31, 2004 and entitled "Memory Egress Self Selection Architecture", which is incorporated by reference herein. The ESS is an output buffered memory switch. An output buffered switch resolves contention for egress ports by connecting each ingress port to every egress port. Each egress port then selects and stores only the data of interest for subsequent output. Power supply current demand of the ESS and similar switch architectures is dominated by the toggling of the wires and associated digital logic that connect data from each ingress port to every egress port. Such systems place a heavy demand on the power supply system since each egress port receives data from all N ingress ports but selects at most 1/Nth of the data for output. Embodiments of the present invention describe a novel method for dividing the data fanout tree into sections and a novel method to scramble each section, such that the power supply current demands are constant from grain to grain, regardless of the underlying data values.

The method disclosed is important for the practical design of memory switches that do not exceed the capabilities of practical power supply systems. The method disclosed is also useful in other applications that have high fanouts.

Figure 3:
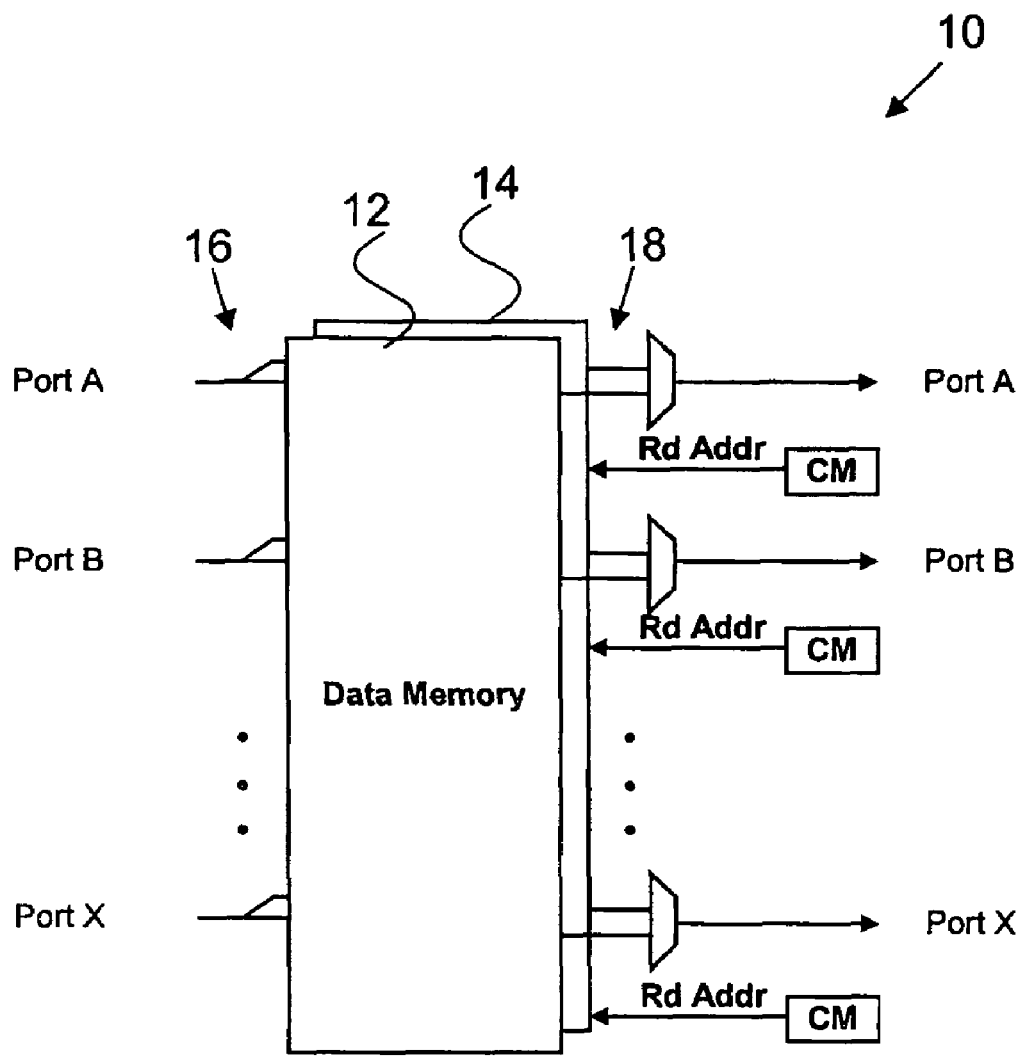
FIG. 3 illustrates the conceptual implementation of an N×N memory switch
Figure 4:
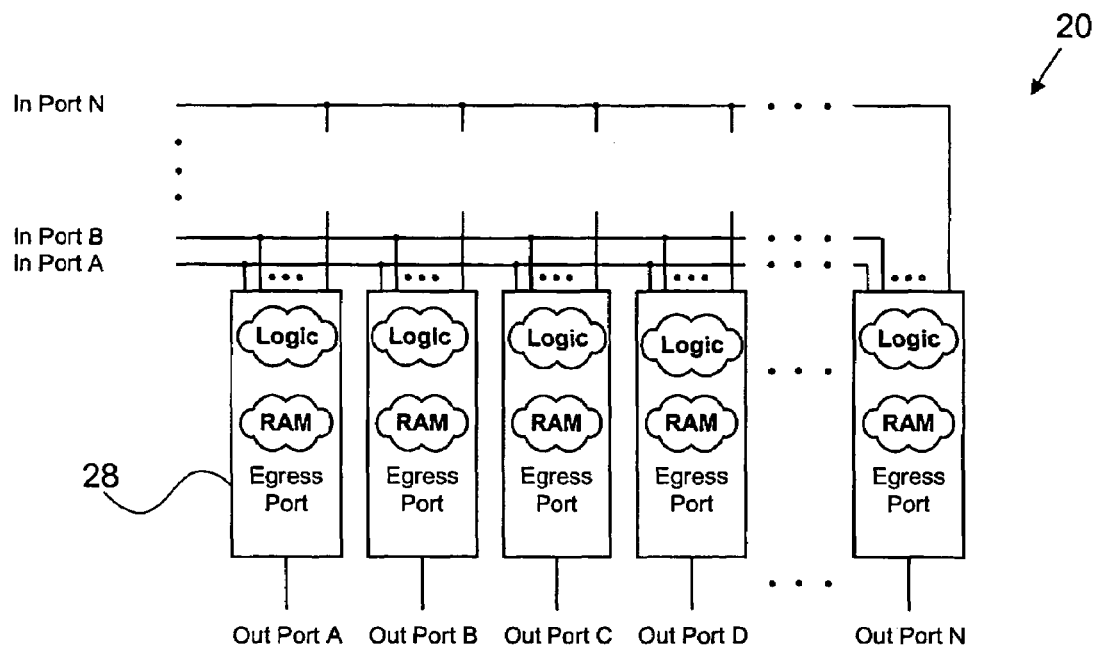
FIG. 4 illustrates an alternative but functionally equivalent implementation of the memory switch of FIG. 3.
Figure 5:
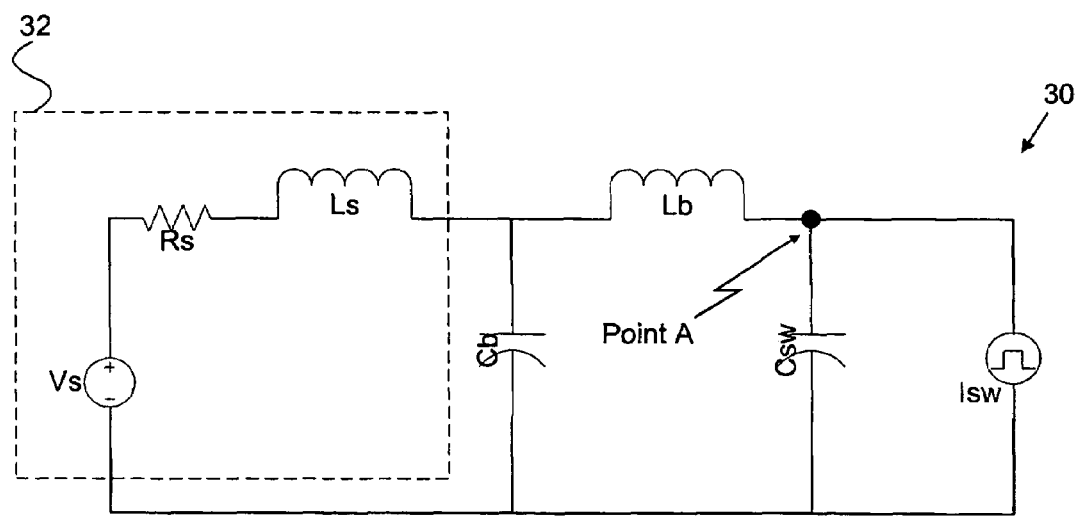
FIG. 5 illustrates a model of a TDM switch with an external power supply.

As described in relation to the output buffered memory switch of FIG. 4, the fanout consists of a buffer tree that may or may not be pipelined, multiplexing logic to select the desired ingress grain, and memory to store the data for later output to the egress ports. Two memories are typically required within the egress port logic as noted in FIG. 3. Such implementations have very large data fanout counts. Every ingress grain from every ingress port is forwarded to each egress port where it may be selected for output.

Figure 8:
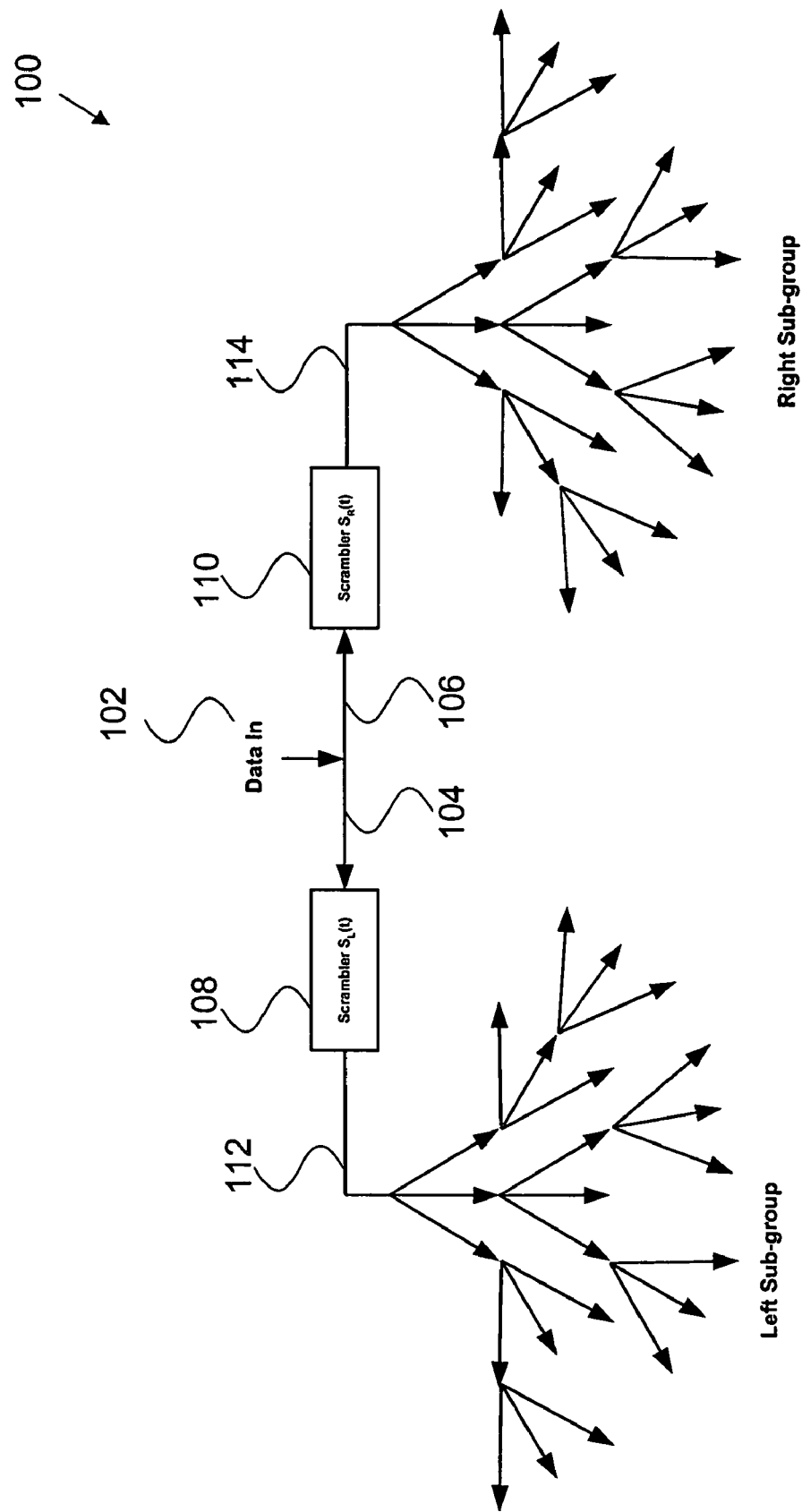
FIG. 8 illustrates a flow diagram for describing a current management scrambling method according to an embodiment of the present invention.

FIG. 8 illustrates a flow diagram 100 for describing a data transmission method, such as a current management scrambling method, according to an embodiment of the present invention. This method can be implemented in a current management scrambling block, device, or any data transmission apparatus. FIG. 8 can be said to show a data fanout tree, such as a byte-wide data fanout tree, in which ingress data, or input data or data in, 102 has been split into two sub-trees, or sub-groups. First sub-group 104 and second sub-group 106 typically initially carry the same data, but will subsequently be scrambled differently. Essentially, for each ingress bit, according to an embodiment of the present invention, either a bit in one sub-group is toggled, or a bit in the other sub-group is toggled, but not both.

The partition, or division, of the sub-groups can be based on balancing the capacitance of the data fanout tree. As such, the data fanout tree is preferably partitioned or divided such that each of sub-groups 104 and 106 has a substantially equal parasitic capacitance. This makes current demand management practical because current demand is evenly split between the sub-groups. The division into the subgroups is typically based on known physical characteristics. For instance, a designer may send a design to a layout engineer, who then returns capacitance information; the designer could then make the determination of how to split the data fanout tree into the sub-groups. Of course, if the capacitance data were supplied to software, the same determination could be made by way of a suitable algorithm. However, the selection of which part of the data fanout tree goes into which sub-group is not made by the scrambler itself, but is done ahead of time.

Embodiments of the present invention require additional steps and/or logic, as compared to known approaches, to scramble the ingress data destined to each sub-group according to a scrambling sequence function, such as a mask. The scrambling sequence function is crafted such that the sum of the bits that toggle in the first sub-group 104 and in the second sub-group 106 is constant, preferably regardless of the ingress data value. In FIG. 8, an embodiment is shown wherein the scrambling sequence function includes first and second scrambling patterns 108 and 110, which are applied to the first and second sub-groups, 104 and 106 respectively. The scrambling sequence function is applied to the two sub-groups 104 and 106 so that a constant sum of toggled bits is achieved during every grain, when considering both sub-groups together. In other words, the first sub-group 104, or the left sub-tree, is scrambled according to the first scrambling pattern 108, and the second sub-group 106, or the right sub-tree, is scrambled according to the second scrambling pattern 110. The fact that a constant number of toggled bits is achieved during every grain is solely due to the chosen scrambling patterns. A rule relating to choosing the patterns will be described later.

In other words, the present invention provides a method of transmitting data in a data transmission apparatus having ingress and egress ports, including the following steps: splitting a fanout of ingress data, from each ingress port to the egress ports, into a first sub-group and a second sub-group; and scrambling the first and second sub-groups according to a scrambling sequence function into first and second scrambled data, respectively, the first and second scrambled data, when considered together, having a constant number of toggled bits with respect to time. The first and second sub-groups can have substantially equal parasitic capacitance. The method can further include the step of de-scrambling the retransmitted data based on the scrambling sequence function.

The step of scrambling the first and second sub-groups according to the scrambling sequence function can include scrambling the first and second sub-groups according to first and second scrambling patterns, respectively. The first and second scrambling patterns can have a bit width equal to a grain group size of the ingress data, when the ingress data is time division multiplexed (TDM) data. The constant number of toggled bits can be equal to half the number of sub-groups.

As will be described later, the step of splitting the fanout of ingress data can include splitting the ingress data into a plurality of groups, a first group including the first and second sub-groups, and a second group including third and fourth sub-groups. In that case, the method further comprises the step of scrambling the third and fourth sub-groups according to a second scrambling sequence function to provide a combined scrambled output of the third and fourth sub-groups has a second constant number of toggled bits with respect to time. The third and fourth sub-groups can have substantially equal parasitic capacitance. Of course, embodiments of the present invention can include a plurality of groups, each with two sub-groups, with the pairs of sub-groups having similar characteristics to those already described. The description and figures show two groups only to simplify the explanation thereof, but the invention is applicable to any number of groups.

The step of scrambling the first and second sub-groups according to the scrambling sequence function can make the constant number of toggled bits with respect to time, independent of the ingress data. The step of scrambling the first and second sub-groups according to the scrambling sequence function can provide a first sub-group scrambled output and a second sub-group scrambled output. The method can further include the step of de-scrambling the retransmitted data based on the scrambling sequence function.

The scrambling patterns 108 and 110 can be defined as $S_L(t)$ and $S_R(t)$, respectively, and specific examples of such patterns will be described later. Here, scrambling is defined as the Exclusive-OR (represented by the symbol $\oplus$) of the data with the corresponding element of a scrambling pattern. For TDM applications, the number of elements in the scrambling patterns $S_L(t)$ and $S_R(t)$ can be equal to the size of the grain group G (see FIG. 1). However, it is often preferable to use a smaller scrambling pattern length, such as a length of 2 scrambling elements. Time t ranges from 0 to G−1. For other applications, the number of elements is application specific.

As will be described later, embodiments of the present invention also employ additional logic at each egress port to undo the scrambling that was introduced by the scrambling sequence mask.

Figure 9:
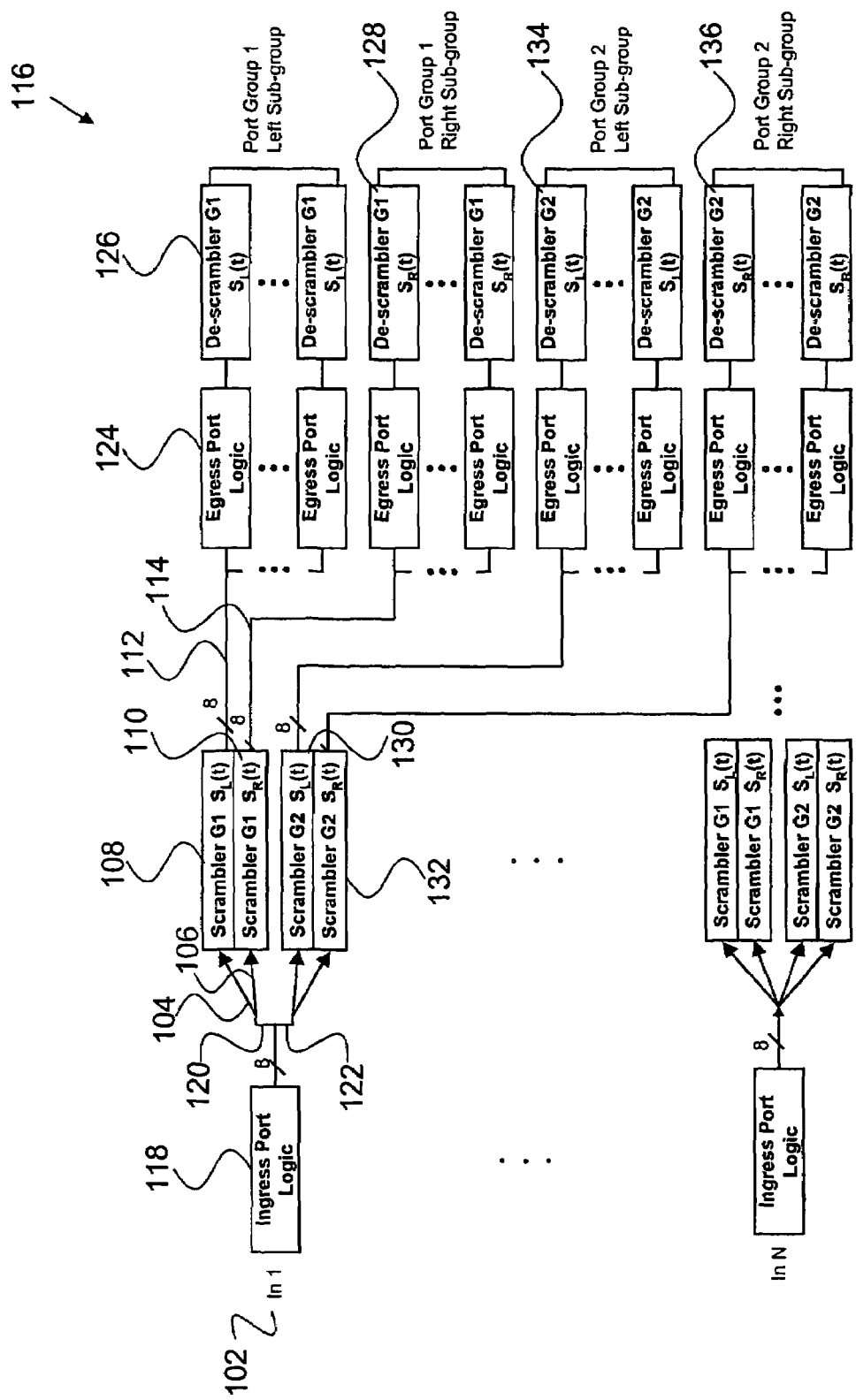
FIG. 9 illustrates a flow diagram for describing a device that incorporates the current management method according to an embodiment of the present invention.

FIG. 9 illustrates a flow diagram for describing a device, such as a data transmission apparatus, that incorporates the current management method according to an embodiment of the present invention. The data transmission apparatus can be an output buffered memory switch. FIG. 8 illustrated the egress ports being divided into one group, which was divided into two sub-groups. In contrast, in FIG. 9, the egress ports are partitioned into a plurality of port groups, e.g. P groups, which can advantageously be an even number, though this is not required. As such, embodiments of the present invention can be described as a current demand management scheme that splits the fanout of ingress data from each ingress port to the egress ports into one or more groups. The situation having two groups of egress port groups is shown in FIG. 9. Splitting the fanout into pairs of sub-groups facilitates the scrambling of data going to each sub-group in a complementary fashion. The goal is to ensure that if one sub-group observed M out of 8 bits per byte changing at a particular timeslot, the other sub-group would observe 8-M bits changing. The sum of both sub-groups always adds up to 8 bits regardless of the contents of the data. The sum can be made up of 0+8, or 1+7, or 2+6, etc. Thus, a certain amount of secondary current balancing can be achieved by having more than one egress port group and by applying a different scrambling pattern to each group. By dividing the fanout tree into multiple groups, one can avoid having the entire tree having lop-sided sums, such as 0+8, or 1+7.

With specific reference to FIG. 9, a plurality of streams of ingress data 102 are received into ingress ports, each having ingress port logic 118. Since G is 2 in this example, the ingress port logic 118 splits the ingress data into a first group 120 and a second group 122. In this example, the first group 120 and the second group 122 can be referred to as Port Group 1 and Port Group 2, respectively. Within each group are two sub-groups 104 and 106, also called the Left and Right sub-groups, as described in relation to FIG. 8. According to a presently preferred embodiment, the two sub-groups 104 and 106 are scrambled using a scrambling sequence mask at a scrambler, which can be implemented as scrambling patterns 108 and 110 applied to the sub-groups 104 and 106, respectively. The scrambling patterns are simply patterns indicating which bits are to be inverted; other means are provided to perform the actual inversions.

Though the data transmission apparatus according to an embodiment of the present invention includes a scrambler, in some preferred embodiments it includes other elements as illustrated in relation to FIG. 9. The outputs from each of the implementations of the scrambling patterns are provided to each egress port, preferably via egress port logic 124. The egress port logic 124 at each egress port can be provided as separate logic for each port, or shared logic that properly receives the appropriate inputs at each egress port. The egress logic changes the order of the data.

At each egress port, the data is de-scrambled to recover the original data. A de-scrambler can implement a de-scrambling sequence function, which is based on the scrambling sequence function. As such, in the case where the scrambling sequence function includes first and second scrambling patterns 108 and 110, the de-scrambling sequence function can include de-scrambling patterns 126 and 128. The de-scrambler can use the timeslot number, the egress group number and left/right sub-group identity to de-scramble. In the situation where the egress logic changes the timing, then an identifier of the scrambling sequence function will be provided to the de-scrambler as part of the data. Otherwise, such information can be provided before the transmission of data (in the case where a standardized scrambling sequence function has been agreed upon) and the de-scrambling can be executed based on that information, which does not need to be included with the data transmission in such a case since it is known a priori.

In the case of two groups, as in FIG. 9, a different scrambling sequence function and corresponding de-scrambling sequence function can be used for each group. As such, third and fourth scrambling patterns 130 and 132 can be used for the second group, in which case corresponding third and fourth de-scrambling patterns 134 and 136 can be used to recover the original data. In general, scrambling patterns can be physically implemented by a single scrambler that can selectively apply different scrambling patterns as appropriate, such as in alternating or periodically recurring timeslots. Similarly, de-scrambling patterns can be physically implemented by a single de-scrambler that can selectively apply different de-scrambling patterns as appropriate, such as in alternating or periodically recurring timeslots.

Ingress data can be split into a plurality of groups in order to improve the management of current in the method. For instance, if there are only two sub-groups and one of the sub-groups is always at a value "8" and the other is always at a value "0", this results in some "hot" lines and some "cool" lines since current will be traveling mostly on some lines and not the others. Splitting the ingress data into a plurality of groups, i.e. more than two sub-groups, helps to further stabilize the current demand and reduces the chances of having "hot" lines and "cool" lines, at least to extremes.

The flow diagram of FIG. 9 can also be seen as illustrating an output buffered memory N-port×N-port switch that has been augmented with the current management scrambling blocks according to an embodiment of the present invention. Although an N×N switch is shown, embodiments of the present invention are equally applicable to switches with an asymmetric number of ports. The current management scrambling blocks significantly reduce or eliminate current demand variations for the logic and wiring in the fanout tree by splitting the fanout of ingress data from each ingress port to the egress ports into groups. The data destined for each group is further split into two sub-groups. Data for each sub-group is scrambled using a sequence that is calculated to maintain the number of toggles of the two sub-groups at a constant sum during each grain. With respect to the egress port logic 124, this can be implemented as an egress selection switch architecture as described in co-pending and commonly assigned United States Patent Application filed on Mar. 31, 2004 and entitled "Memory Egress Self Selection Architecture". This situation will be described later in some detail.

In other words, the present invention provides a data transmission apparatus having ingress and egress ports, and includes a scrambler for splitting a fanout of ingress data, from each ingress port to the egress ports, into a first sub-group and a second sub-group. The scrambler scrambles the first and second sub-groups according to a scrambling sequence function to provide a combined scrambled output of the first and second sub-groups having a constant number of toggled bits with respect to time.

The scrambler can further include ingress port logic for splitting the ingress data into a plurality of groups, a first group including the first and second sub-groups, and a second group including third and fourth sub-groups. In such a case, the scrambler scrambles the third and fourth sub-groups according to a second scrambling sequence function to provide a combined scrambled output of the third and fourth sub-groups having a second constant number of toggled bits with respect to time. The third and fourth sub-groups can have substantially equal parasitic capacitance. Of course, embodiments of the present invention can include a plurality of groups, each with two sub-groups, with the pairs of sub-groups having similar characteristics to those already described. The description and figures show two groups only to simplify the explanation thereof, but the invention is applicable to any number of groups.

The first and second sub-groups can have substantially equal parasitic capacitance. The scrambling sequence function can include first and second scrambling patterns for scrambling the first and second sub-groups, respectively. When the ingress data is time division multiplexed (TDM) data, the first and second scrambling patterns can each have a bit width equal to a grain bit width of the ingress data. The first and second scrambling patterns can each have a length of 2 scrambling elements, and the constant number of toggled bits can be equal to half the number of sub-groups.

The constant number of toggled bits can be made independent of the ingress data. The scrambler can scramble the first and second sub-groups according to the scrambling sequence function to provide a first sub-group scrambled output and a second sub-group scrambled output.

As described earlier, a data fanout tree, such as a byte-wide data fanout tree, according to an embodiment of the present invention is split into two sub-trees, or a plurality of pairs of sub-trees, or sub-groups. The following discussion provides a theoretical explanation and justification of how and why the implementation of embodiments of the present invention work as they do. The discussion focuses on the particular example where the scrambling sequence mask includes first and second scrambling patterns applied to the first and second sub-groups, respectively.

Consider that the left sub-tree is scrambled with the hexadecimal scrambling pattern $S_L(t)$ and the right sub-tree with the hexadecimal scrambling pattern $S_R(t)$, with $S_L(t)$ and $S_R(t)$ being defined in Equations 1 and 2 below.

$$S_L(t)=\{00,55,00,55,00,55,\ldots\}\text{(In hexadecimal)} \quad \text{Equation 1}$$

$$S_R(t)=\{00,AA,00,AA,00,AA,\ldots\}\text{(in hexadecimal)} \quad \text{Equation 2}$$

The following terminology is advantageously used with respect to the scrambling patterns. Each scrambling pattern includes a plurality of scrambling elements (such as "00" or "55"). The number of scrambling elements in the scrambling pattern can be referred to as the length of the scrambling pattern. The number of bits in each scrambling element can be referred to as the bit width of the scrambling pattern. So, for $S_L(t)=\{00, 55\}$, the scrambling pattern has two scrambling elements. Therefore, the length of the scrambling pattern is 2. Since "00" in hexadecimal is equal to "00000000" in binary, the bit width of the scrambling pattern is 8, since there are 8 bits in the scrambling element.

As mentioned earlier, for TDM applications, the number of scrambling elements in the scrambling patterns $S_L(t)$ and $S_R(t)$ (or the length of the scrambling pattern) can be equal to the size of the grain group G. The width of the bus typically determines the number of bits in each item of Equation 1. In other words, each item (such as "00" or "55") is applied to one grain. For non-TDM applications, it is not required to have the number of elements to match the grain group size. As such, for non-TDM, each of $S_L(t)$ and $S_R(t)$ can include two items, or have a length of 2, e.g. $S_L(t)=\{00, 55\}$ and $S_R(t)=\{00, AA\}$. Though it can be preferable in some circumstances to have more than two scrambling elements (or a length of greater than 2), an implementation using two scrambling elements in each scrambling pattern is the simplest implementation according to embodiments of the present invention.

A Count function (C[.]) can be defined, which counts the number of bits that are set high in a data bus. The count function is a way of defining a mathematical function that makes description of embodiments of the present invention easier, and is also sometimes referred to as a weight function. For example, $C['h55]=4$ and $C['h12]=2$. The number of bits that are toggled ($B_T$) at timeslot t is given by Equation 3. D(t) represents the input data at time t.

$$B_T(t)=C[D(t-1) \oplus S_L(t-1) \oplus D(t) \oplus S_L(t)]+C[D(t-1) \oplus S_R(t-1) \oplus D(t) \oplus S_R(t)] \quad \text{Equation 3}$$

When t is odd, $S_L(t-1)=S_R(t-1)='h00$, $S_L(t)='h55$, and $S_R(t)='hAA$. Substituting these into Equation 3, the number of bits that toggled is given by Equation 4 below. The vector X(t) represents how the data changed from cycle to cycle.

$$\begin{aligned} B_T(t) &= C[D(t-1) \oplus 'h00 \oplus D(t) \oplus 'h55] + \\ &\quad C[D(t-1) \oplus 'h00 \oplus D(t) \oplus 'hAA] \\ &= C[X(t) \oplus 'h55] + C[X(t) \oplus 'hAA] \\ &= 8 \end{aligned} \quad \text{Equation 4}$$

When t is even, $S_L(t-1)='h55$, $S_R(t-1)='hAA$, and $SL(t)=S_R(t)='h00$. Substituting these into Equation 3, the number of bits that are toggled is given by Equation 5 below.

$$\begin{aligned} B_T(t) &= C[D(t-1) \oplus 'h55 \oplus D(t) \oplus 'h00] + \\ &\quad C[D(t-1) \oplus 'hAA \oplus D(t) \oplus 'h00] \\ &= C[X(t) \oplus 'h55] + C[X(t) \oplus 'hAA] \\ &= 8 \end{aligned} \quad \text{Equation 5}$$

As can be seen from the equations above, the number of bits that are toggled between any two timeslots (t−1) and (t), after scrambling, is always 8, for a byte wide bus, i.e. a bus that is 8 bits wide.

It is possible to re-cast Equation 3 to yield Equation 6, which is only true if Equation 7 is satisfied.

$$\begin{aligned} B_T(t) &= C[D(t-1) \oplus D(t) \oplus S_L(t-1) \oplus S_L(t)] + \\ &\quad C[D(t-1) \oplus D(t) \oplus S_R(t-1) \oplus S_R(t)] \\ &= C[X(t) \oplus S_L(t-1) \oplus S_L(t)] + \\ &\quad C[X(t) \oplus S_R(t-1) \oplus S_R(t)] \\ &= 8, \text{ if and only if Equation 9 is satisfied.} \end{aligned} \quad \text{Equation 6}$$

$$S_L(t-1) \oplus S_L(t) \oplus S_R(t-1) \oplus S_R(t) = \text{all ones} \quad \text{Equation 7}$$

For any particular bit in X(t), by Equation 7, the corresponding bit of $[S_L(t-1) \oplus S_L(t)]$ and of $[S_R(t-1) \oplus S_R(t)]$ must be complementary. Thus, regardless of the value of any particular bit in X(t), either $[X(t) \oplus S_L(t-1) \oplus S_L(t)]$ is high or $[X(t) \oplus S_R(t-1) \oplus S_R(t)]$ is high, but not both. One or the other of the Count functions (C[.]). would increment. The total of both functions always sums to 8, the width of the bus.

Using Equation 7, it is possible to construct a wide range of operative sequences. A few sample alternatives are shown in Equation 8 below. Equation 7 holds for buses of any width, from 1 bit to N bits.

$$S_L(t)=\{00,0F,00,0F,00,0F, \ldots\}$$

$$S_R(t)=\{00,F0,00,F0,00,F0, \ldots\}$$

$$S_L(t)=\{01,00,01,00,01,00, \ldots\}$$

$$S_R(t)=\{00,FE,00,FE,00,FE, \ldots\}$$

$$S_L(t)=\{03,0C,03,0C,03,0C, \ldots\}$$

$$S_R(t)=\{30,C0,30,C0,30,C0, \ldots\} \quad \text{Equation 8}$$

Equation 7 can be generalized to Equation 9 for the case of having K sub-groups, where K is an even number.

For each bit in the scrambling sequence $S_i(t)$, $$\sum_{i=1}^{K} C[Si(t-1) \oplus Si(t)] = \frac{K}{2} \quad \text{Equation 9}$$

In other words, for each bit in the scrambling sequence, the count of the bits that change in the scrambling patterns from one time period to the next is constant, and can be equal to half of the number of sub-groups. If there are two sub-groups, the count is simply 1.

Figures 6, 7:
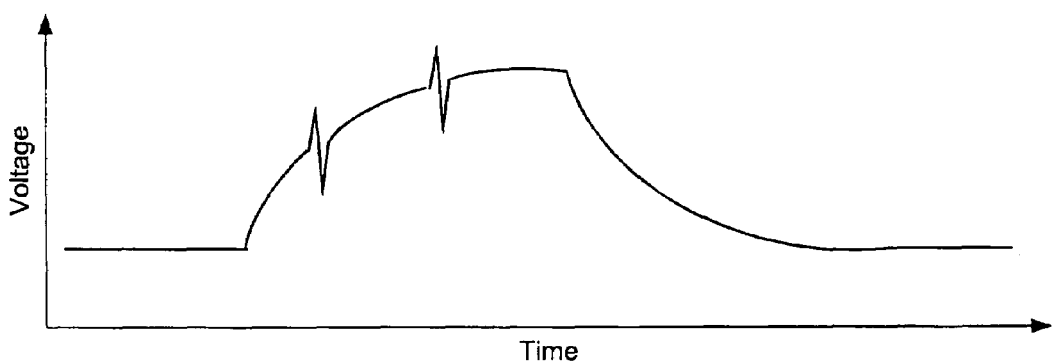
FIG. 6 illustrates a SONET STS-48 frame, or equivalently an SDH STM-16 frame.
FIG. 7 illustrates the voltage at point A of FIG. 5.

Therefore, when data fanout is divided into sub-groups and each sub-group is separately scrambled, as described above, $B_T(t)$ is completely independent of the ingress data stream D(t). Since the number of bits that are toggled is always constant, the current demand for charging and discharging parasitic capacitors is also constant. Therefore, when implementing embodiments of the present invention as described above, the voltage ramp and the voltage spike of prior art implementations, as shown in FIG. 7, are significantly reduced, or eliminated. It is interesting to note that the $B_T(t)$ is equal to the average number of toggles in a system without current demand management under random ingress data conditions. Thus, current demand management does not increase power consumption compared to random ingress data, and provides an upper bound that is one half the maximum possible power consumption given the worst case ingress data. For buses of different widths, the scrambling pattern would have to be scaled to match the width of the data.

Practically speaking, if more than two sub-groups are used, it is preferable to employ an even number of sub-groups, i.e. pairs of sub-groups. This is to satisfy the requirement in Equation 9 that K/2 be a whole number. It is possible to use an odd number of sub-groups greater than two, but poorer results will be achieved. When a plurality of groups is used, each group can be assigned arbitrary scrambling pattern sets, or scrambling sequence functions, without regard to each other. The sub-groups within each group are assigned scrambling patterns that obey Equation 9. However, there is no requirement that the scrambling patterns in one group have any relationship with the scrambling patterns of another group. Equation 9 can be explained as being the rule that must be satisfied when choosing scrambling sequence functions, or scrambling patterns, according to embodiments of the present invention.

It should be noted that the scrambler described in relation to embodiments of the present invention differs fundamentally from the traditional scramblers, or scrambling methods. A scrambler according to an embodiment of the present invention guarantees that $B_T(t)$ is constant. A pseudo-random scrambler can only provide a statistical bound that $B_T(t)$ tends towards an average value. Pathological data patterns can mimic the pseudo-random scrambler leading to long periods of very high or very low $B_T(t)$ and consequently periods with variations in current demand. Methods to reduce overall current demand, such as sending the true or complement form of the data, depending on which has lower transitions, are also statistical in nature. For example, when a consecutive sequence of ingress data bytes have the same value the data would not be modified. Consequently, current demand would be at zero and the voltage would rise. When data resumes, and only 4 bits changed, there will also be no reason to modify the data. One would again get a current spike of one-half the maximum unmanaged amplitude. At the opposite end of the scale, there are techniques, which maintains the current demand at maximum using dummy loads, for example. These tend to be more successful in reducing variations in current demands from cycle to cycle, but at a cost of doubling the total power consumption.

Telecommunication systems typically have a maximum power budget for printed circuit boards of between 100 W and 120 W. In a switch fabric card, the TDM switch component often consumes the majority of that power. These components may generate current demand spikes that are up to 100 Amperes in amplitude, and are only nanoseconds in duration. It is very expensive and complex to implement power supply systems that can both deliver the large amount of power and react to such rapid current demand changes.

Figure 10:
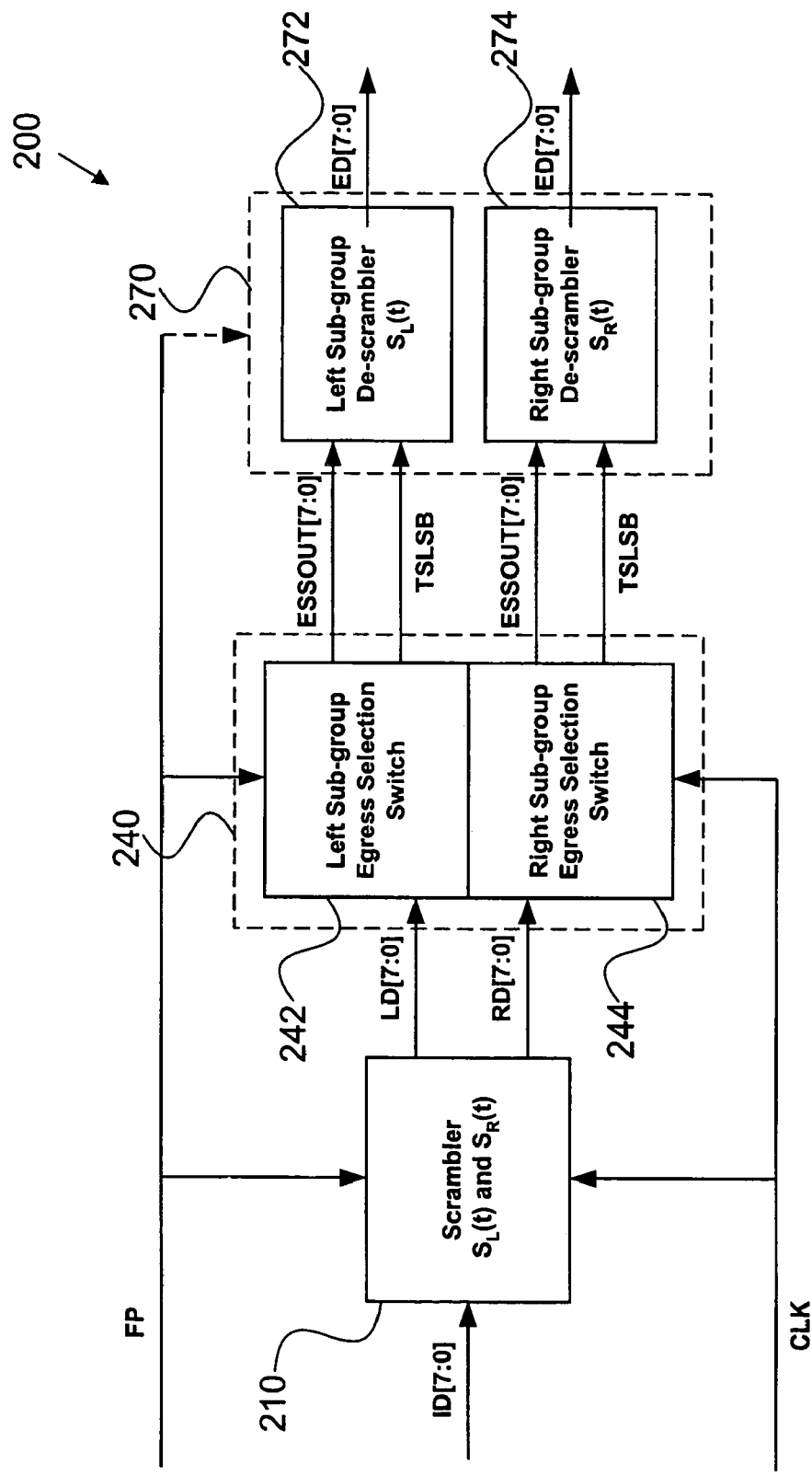
FIG. 10 illustrates a block diagram of a data transmission apparatus, such as a port device for a memory switch, according to an embodiment of the present invention.

FIG. 10 illustrates a block diagram of a data transmission apparatus 200, such as a port apparatus or a port device for a memory switch, according to an embodiment of the present invention. FIG. 10 illustrates the relationship between three blocks in a TDM switch where there is only one egress port group. Though a preferred embodiment of the present invention includes only a scrambler 210, other embodiments include further elements, which are included in FIG. 10, for ease of explanation, and are described below. The scrambler 210 is located at each ingress port. It generates a separate data stream for egress ports in the first and second sub-groups, i.e. the Left sub-group and the Right sub-group. Within each egress port is egress logic 240, which can be implemented as an egress selection switch block. The egress logic 240 receives a byte of data from the scrambler in each ingress port and stores only the data that it needs to be output at the next grain group time. The data that are not needed are ignored.

The egress logic 240 in FIG. 10 services two egress data streams, and can preferably be implemented as two separate logic blocks: a first sub-group (or left sub-group) egress selection switch 242; and a second sub-group (or right sub-group) egress selection switch 244, with egress selection switches 242 and 244 servicing the two egress data streams respectively. A de-scrambler 270 is located at the output of each egress port. The de-scrambler 270 uses a de-scrambling function on scrambled data to perform the required de-scrambling to recover the original data. The de-scrambling function can preferably be based on the ingress timeslot number of the data to apply appropriate de-scrambling to restore the original data. The de-scrambler 270 in FIG. 10 services two egress data streams, and can preferably be implemented as two de-scrambler blocks: a first sub-group (or left sub-group) de-scrambler 272 and a second sub-group (or right sub-group) de-scrambler 274, with de-scramblers 272 and 274 servicing the two egress data streams respectively.

Figure 11:
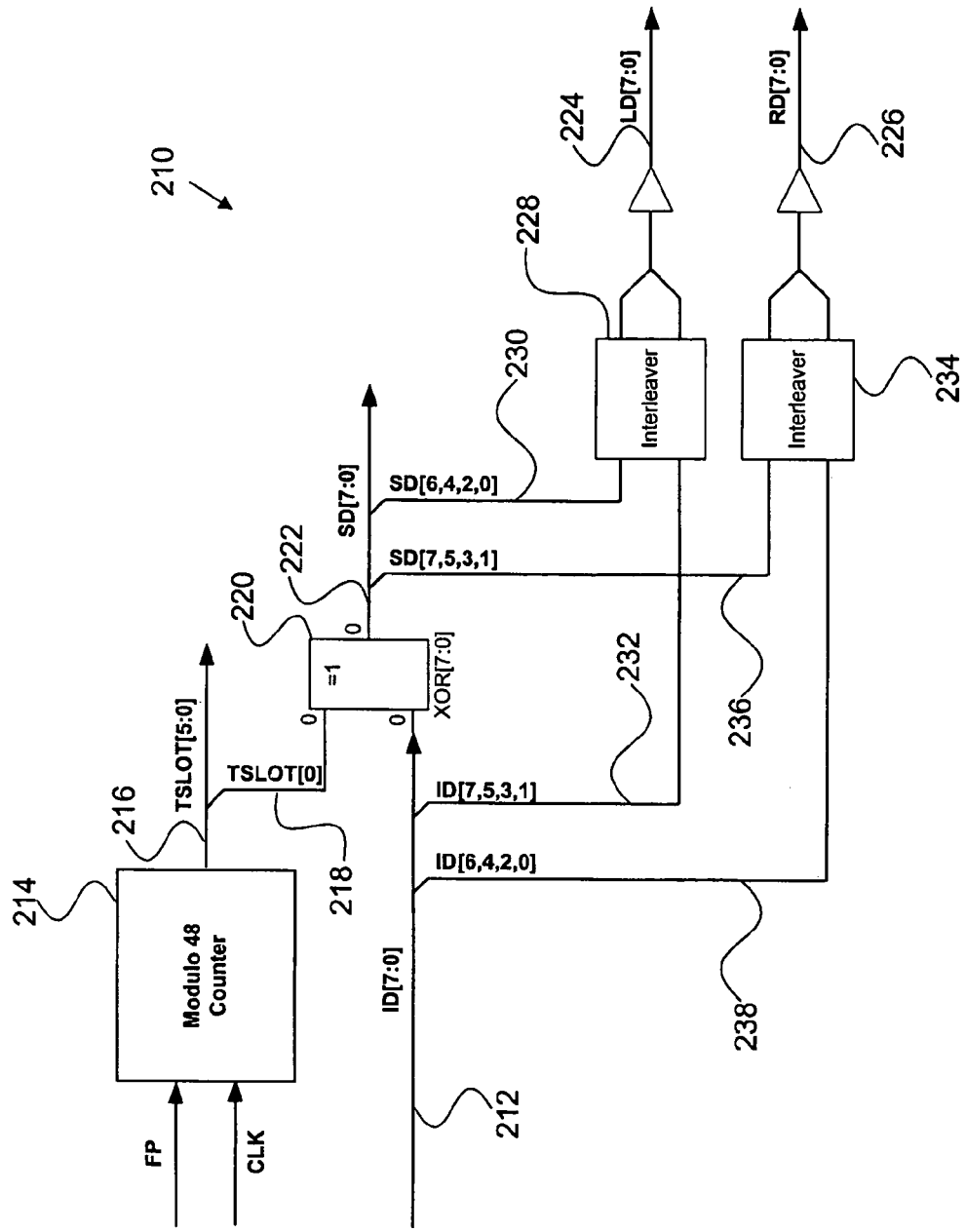
FIG. 11 illustrates a block diagram of a scrambler according to an embodiment of the present invention.

FIG. 11 illustrates a block diagram of a scrambler 210 according to an embodiment of the present invention. The particular scrambler shown in the example of FIG. 10 relates to a SONET STS-48/SDH STM-16 application, and is specifically for use with scrambling patterns as defined in Equations 1 and 2. The clock signal CLK provides timing for the entire scrambler 210. In this implementation, the clock signal is preferably a 311 MHz clock, matching the period of one byte of data on the SONET/SDH stream. CLK is distributed in common to the entire TDM switch device. Ingress data is supplied by (and received on) the data path 212, also identified as ID[7:0]. A new byte is delivered every CLK cycle. A counter 214, such as a modulo-48 counter, keeps track of the 48 timeslots in the SONET/SDH stream. The counter 214 is initialized to 0 by the frame pulse signal FP once per SONET/SDH frame, or multiples thereof. The output of the counter 214 is provided on binary data path 216, also indicated as TSLOT[5:0]. In accordance with Equation 1 and Equation 2, only bytes in odd timeslots are scrambled. A logic high on the least significant bit of the counter output (TSLOT[0]), shown on data path 218, enables XOR gates 220 (XOR[7:0]) to scramble the data. The XOR gates 220 invert the ID byte (in odd timeslots) so that the SD byte is a complement of the ID byte in odd timeslots. The scrambled data is provided on data path 222, also indicated as SD[7:0]. As already mentioned, at odd timeslots SD[7:0] is the inverted version of ID[7:0]. At even timeslots, SD[7:0] is a copy of ID[7:0]. As mentioned earlier, the scrambling patterns are simply patterns indicating how the scrambling should be implemented. In the embodiment of FIG. 11, the XOR gates 220 actually perform the required inversion.

The scrambler 210 generates two data streams 224 and 226, also indicated by LD[7:0] and RD[7:0], respectively. The data stream 224, i.e. LD[7:0], is destined for the egress ports in the left sub-group, or first sub-group, and the data stream 226, i.e. RD[7:0], is destined for those in the right sub-group, or second sub-group, of the egress port group supported by this scrambler. Two combiners, or interleavers, are included to select which bits of complemented data to include in LD and RD. The data stream 224 is constructed by inter-leaving, via a left group interleaver 228, the even bits of SD[7:0] provided on data path 230 with the odd bits of ID[7:0] provided on data path 232. The data stream 226 is constructed by inter-leaving, via right group interleaver 234, the odd bits of SD[7:0] provided on data path 236 with the even bits of ID[7:0] provided on data path 238. Table 1 illustrates the assignment of ID[7:0] and SD[7:0] bits to LD[7:0] and RD[7:0].

TABLE 1

| Bit Assignment of LD[7:0] and RD[7:0] | | | |
|---|---|---|---|
| LD[7:0] | From | RD[7:0] | From |
| LD[7] | ID[7] | RD[7] | SD[7] |
| LD[6] | SD[6] | RD[6] | ID[6] |
| LD[5] | ID[5] | RD[5] | SD[5] |
| LD[4] | SD[4] | RD[4] | ID[4] |
| LD[3] | ID[3] | RD[3] | SD[3] |
| LD[2] | SD[2] | RD[2] | ID[2] |
| LD[1] | ID[1] | RD[1] | SD[1] |
| LD[0] | SD[0] | RD[0] | ID[0] |

At even timeslots, ID[7:0] is reproduced on LD[7:0] and RD[7:0]. At odd timeslots, LD[7:0] is equal to ID[7:0] after scrambling by the byte 'h55 and RD[7:0] is equal to ID[7:0] after scrambling by 'hAA. So, only even bits are inverted in LD, and only odd bits are inverted in RD, if at all. The scrambler provides suitable apparatus to implement the separation of data streams into even and odd timeslot groups, as should be obvious to those skilled in the art of electronics circuit design.

For more complex scrambling sequences, the scrambler block may account for more than just the least significant bit of the ingress timeslot of the data. The required extensions to the scrambler circuit are simple and should be obvious to those skilled in the art of electronics circuit design.

In other words, the present invention provides a scrambler for use with a data transmission apparatus having ingress and egress ports. The scrambler includes ingress logic for splitting a fanout of ingress data, from each ingress port to the egress ports, into a first sub-group and a second sub-group. The scrambler also includes scrambling logic for scrambling the first and second sub-groups according to a scrambling sequence function to provide a combined scrambled output of the first and second sub-groups has a constant number of toggled bits with respect to time. The scrambler can further include a counter for counting timeslots in the ingress data, and a plurality of XOR gates for scrambling the ingress data in response to an output of the counter, to provide the first and second sub-group scrambled outputs. The scrambler can also include first and second sub-group interleavers for providing the first and second sub-group scrambled outputs, respectively.

With respect to the egress logic 240 of FIG. 10, this egress logic can be implemented according to an embodiment of the present invention such that the egress selection switch (ESS) blocks 242 and 244 collectively implement an output buffered memory switch. Each block provides data for one egress port. The egress logic, or ESS block, 240 performs two functions: selection and storage of a grain group of data from the ingress ports and output of the stored data.

In other words, a data transmission apparatus according to an embodiment of the present invention can include egress logic for receiving and retransmitting scrambled data received from the scrambler. The egress logic can include first and second sub-group egress selection switches for receiving and retransmitting first and second sub-group scrambled outputs, respectively, from the scrambler. The egress logic can retransmit scrambled data such that it reorders the scrambled data. The egress logic can also retransmit scrambled data such that it changes the timing of the scrambled data and transfers an identifier of the scrambling sequence function.

Figure 12:
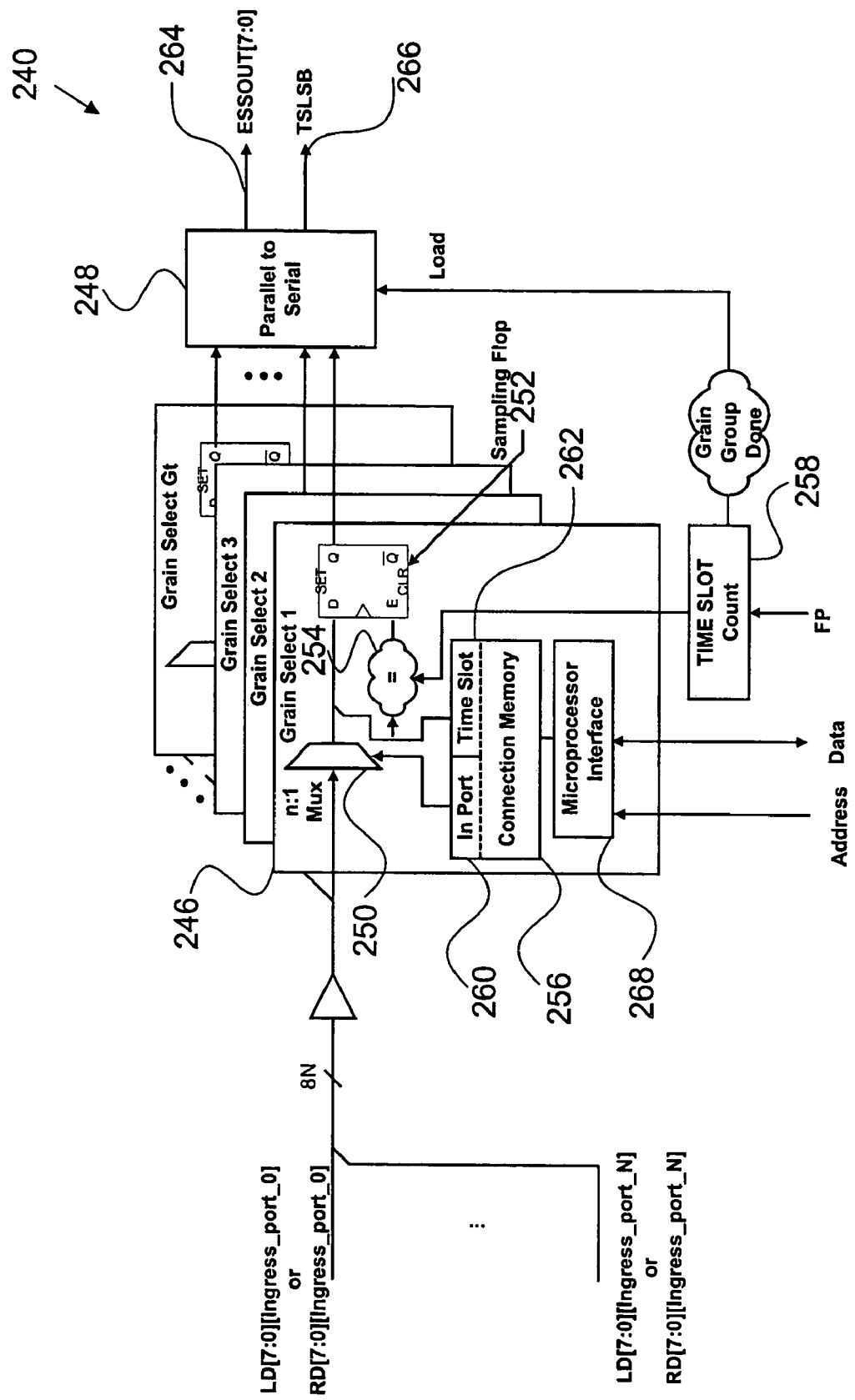
FIG. 12 illustrates a hardware circuit embodiment of egress logic within an egress port of a data transmission apparatus according to an embodiment of the present invention.

FIG. 12 illustrates a hardware circuit embodiment of the egress logic 240 within an egress port within an apparatus according to an embodiment of the present invention. The egress logic 240 is composed of multiple grain select blocks 246, one block for each grain of a grain group. For example, an implementation of a SONET circuit switch may select a grain group size of 48 grains to process STS-48 signals. The egress logic 240 for such a switch would then include 48 grain select blocks 246. Each grain select block 246 selects the ingress grain that will be output at the associated timeslot of a grain group for the egress port of the egress logic. For example, grain select block six will store the ingress grain from the ingress ports that will be output at timeslot six. A parallel to serial converter 248 transfers the content of the stored grains to a shift register once every grain group, and then serial shifts the grains to the de-scrambler.

Each grain select block 246 can be implemented, according to a presently preferred embodiment, as: a N:1 multiplexer, or mux, 250; a sampling flop 252 to store the output of the mux 250; a timeslot comparator 254; and connection memory 256. The grain select block 246 in such an implementation requires a timeslot counter 258 that marks the timeslot number of the ingress grains by repeatedly incrementing from one to the grain group size. The timeslot counter 258 is synchronized to a system frame pulse FP such that grains are properly identified. The timeslot counter 258 may be shared between one or more grain select blocks.

The connection memory 256 defines the ingress port and timeslot of the source grain for the egress grain associated with the grain select block. For example, grain select block six will store the ingress grain from the ingress ports that will be output at timeslot six of the egress grain group. The ingress port field 260 of the connection memory controls the select input of the mux 250. The mux 250 presents all ingress grains from the specified ingress port to the sampling flop 252. The timeslot field 262 of the connection memory 256 is compared to the timeslot counter 258. When the timeslot field 262 and the timeslot counter 258 are equal, the sampling flop 252 is enabled and the desired grain is stored. When the timeslot counter 258 reaches the count of the last grain of the grain group, the content of the sampling flops from the grain select blocks is transferred to a register within the parallel to serial block 248. The data is then shifted out to the de-scrambler via data path 264, also identified as ESSOUT[7:0]. The grain select blocks 246 and parallel to serial converter block 248 operate concurrently, such that one grain group of data is shifted to the egress port while data for the next grain group is being sampled and stored by the grain select blocks.

Simultaneous to storing the desired grain, the sampling flop 252 also stores the least significant bit (LSB) of the ingress timeslot number. If the LSB is high, the grain stored originated from an odd timeslot in the ingress port. If the LSB is low, the grain is from an even timeslot. When the stored grains are transferred to the parallel to serial block 248, the LSB is also transferred. The LSB is shifted out in unison with its associated data on the data path 266, also indicated as TSLSB, to the de-scrambler. As an alternative, the LSB does not need to be stored by the sampling flop 252, as it is already available in the connection memory 256. When the associated data grain is shifted out on the data path 264, or ESSOUT[7:0], a multiplexer may read the connection memory for the ingress timeslot number. This alternative is not shown in FIG. 12.

Operation of the egress logic 240 generally requires programming of the connection memory 256. This programming can be done via a microprocessor interface 268 or other mechanism. Content of connection memory determines the switch settings. It may be desirable to coordinate the change of switch settings for all ESS blocks within a device or all devices within a system. The egress logic 240 can be enhanced to support two connection memory pages with page changes occurring at a specified boundary (typically a predefined point in a frame for SONET systems).

Latches can be used to implement a single word of connection memory 256 for each grain select block 246. The connection memory content is static, and therefore, does not consume dynamic power. Note that the current demand of this logic, i.e. the fanout of ingress data through the buffer tree and multiplexers, is considered part of the fanout of ingress data to all egress ports. The current management scheme of the present invention eliminates the current variations in the fanout tree within the egress logic and is applicable to any similar implementation.

For more complex scrambling sequences, the egress logic 240 may need to supply the de-scrambler with more than just the least significant bit of the ingress timeslot of the data. The required extensions to the egress switch selection are simple and should be obvious to those skilled in the art of electronics circuit design.

In some embodiments, the egress logic 240 does not modify the order of the data from the scrambler. In that case, the egress logic 240 does not need to supply the TSLSB signal to the de-scrambler.

Figure 13:
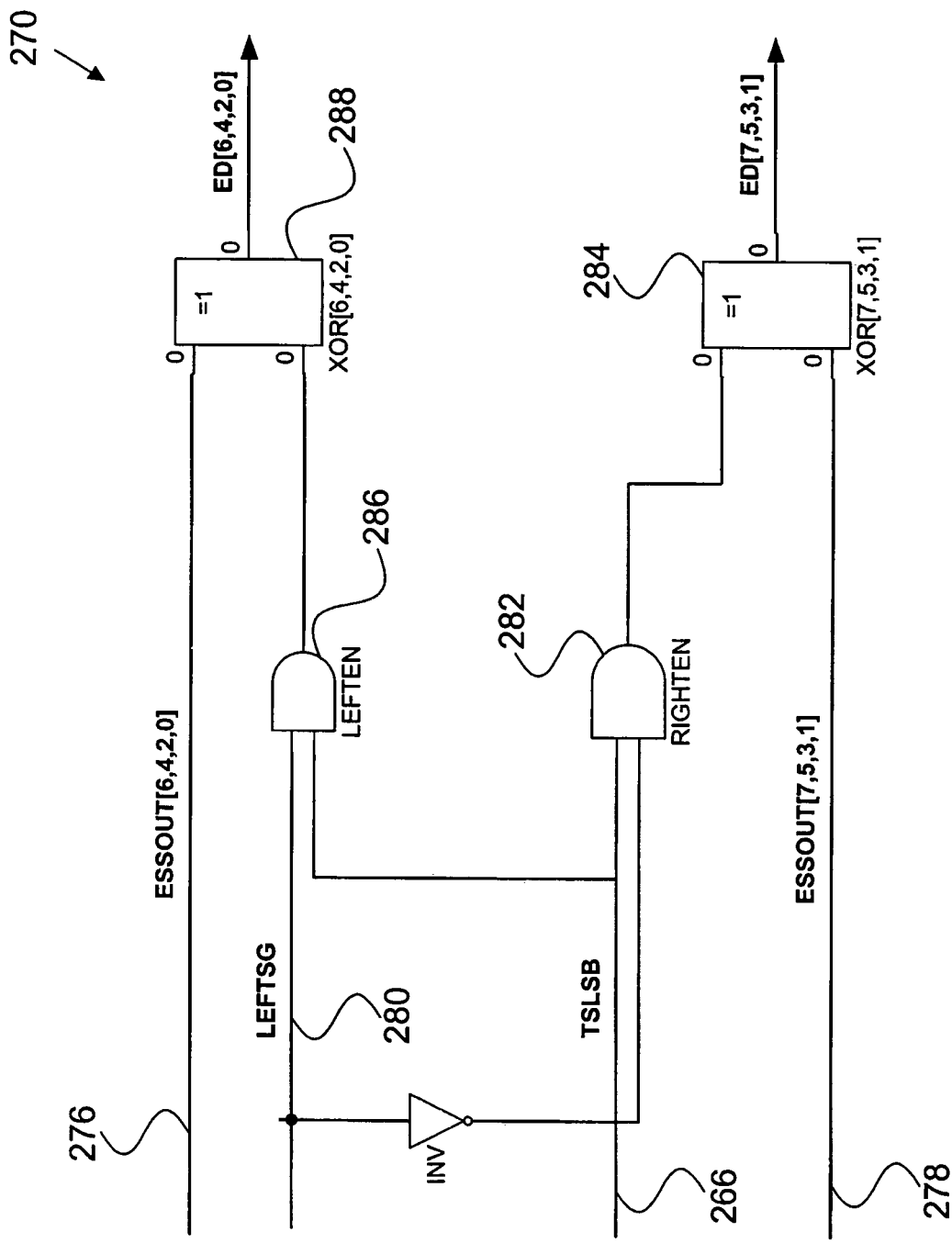
FIG. 13 illustrates a hardware circuit embodiment of a de-scrambler according to an embodiment of the present invention.

FIG. 13 illustrates a hardware circuit embodiment of the de-scrambler 270. In this particular example, the descrambler 270 is for a SONET STS-48/SDH STM-16 application. The specific example of FIG. 13 is for de-scrambling scrambled data received from the scrambler in FIG. 10, which is for use with scrambling patterns as defined in Equations 1 and 2. Data to be de-scrambled is supplied on the data path 264, also identified by ESSOUT[7:0] in FIG. 12. In FIG. 13, the data path 264 is represented by two separate data paths: data path 276 for ESSOUT[6,4,2,0], or the even timeslots of ESSOUT; and data path 278 for ESSOUT[7,5,3,1], or the odd timeslots of ESSOUT. The LSB of the ingress timeslot of the data is available on the data path 266, also identified by TSLSB in FIGS. 12 and 13. A signal on data path 280, also identified as LEFTSG, is set high to configure the de-scrambler 270 to operate in the Left sub-group, or the first sub-group of an egress port group. The signal on data path 280 is set low to configure for operation in a Right sub-group, or the second sub-group.

A new byte is delivered every CLK cycle on ESSOUT[7:0], or data paths 276 and 278, with an associated TSLSB on data path 266. The signal LEFTSG on data path 280 configures the de-scrambler to be operating on either the Left sub-group or the Right sub-group. An AND gate 282, also identified as RIGHTEN, controls XOR gates 284, namely XOR [7], XOR[5], XOR[3] and XOR[1]. Another AND gate 286, also identified as LEFTEN, controls XOR gates 288, namely XOR[6], XOR[4], XOR[2] and XOR[0]. RIGHTEN is set high when LEFTSG is set low and TSLSB is set high. This occurs when the de-scrambler is operating on the Right sub-group and the data byte originated from an odd timeslot. The data would have been scrambled by an 'hAA element in the sequence $S_R(t)$ (See Equation 2). To de-scramble, the XOR gates XOR[7], XOR[5], XOR[3] and XOR[1] invert to bits 7, 5, 3, and 1, respectively, of ESSOUT[7:0]. Similarly, LEFTEN is set high when LEFTSG and TSLSB are both set high. This occurs when the de-scrambler is operating on the Left sub-group and the data byte originated from an odd timeslot. The data would have been scrambled by a 'h55 element in the sequence $S_L(t)$ (See Equation 1). To de-scramble, the XOR gates XOR[6], XOR[4], XOR[2] and XOR[0] invert to bits 6, 4, 2, and 0, respectively, of ESSOUT [7:0]. The output of the XOR gates form the output of the de-scrambler (ED[7:0]).

In applications where the block upstream of the de-scrambler 270 does not modify the order of the data from the scrambler, the de-scrambler 270 can be modified to not need the TSLSB signal. Instead, the de-scrambler 270 in such a case would include a modulo-48 counter, such as the counter 214 in FIG. 11, to implicitly deduce the scrambling pattern applied to the current ESSOUT[7:0].

In other words, a data transmission apparatus according to an embodiment of the present invention can include a de-scrambler for receiving scrambled data, and for de-scrambling the scrambled data based on the scrambling sequence function. The de-scrambler can include a first sub-group descrambler and a second sub-group descrambler, for descrambling the first sub-group and second sub-group, respectively. The de-scrambler can de-scramble the retransmitted data based on a scrambling sequence function identifier, such as: an ingress timeslot number, an egress group number, and a sub-group identifier. The de-scrambler can selectively de-scramble the first-sub group and the second sub-group of an egress port group in response to a configuration signal. The de-scrambler can include a first AND gate coupled to first XOR gates for descrambling the first sub-group, and a second AND gate coupled to second XOR gates for descrambling the second sub-group. The de-scrambler can also include a counter for determining the scrambling sequence function.

For more complex scrambling sequences, the de-scrambler 270 may need to be supplied with more than just the least significant bit of the ingress timeslot of the data. The required extensions to the de-scrambler circuit are simple and should be obvious to those skilled in the art of electronics circuit design.

Embodiments of the present invention can be applied to any system where data must fanout from a single source to many destinations. Switches are just one common application with high fanout. The scrambling sequences of Equation 1 and Equation 2 are simply examples of many possible sequences. Any sequence pair that conforms to Equation 7 will be operative in significantly reducing, or eliminating, power supply current demand variations.

Figure 14:
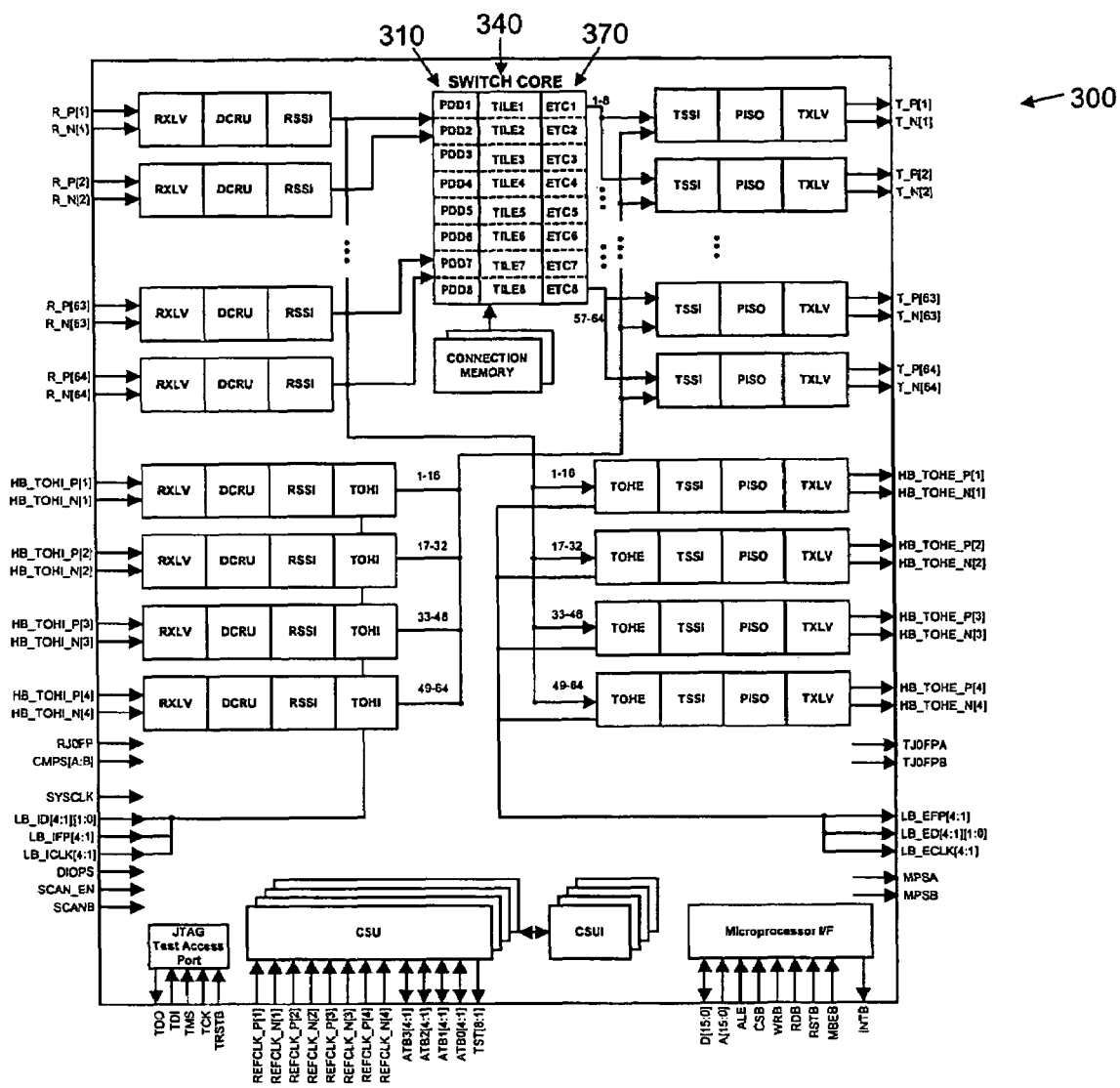
FIG. 14 illustrates an embodiment according to the invention of a SONET/SDH cross connect switch.

FIG. 14 illustrates an embodiment according to the invention of a SONET/SDH cross connect switch 300. The scrambler 210 is implemented in the PDD blocks 310. The egress logic 240 is implemented in the TILE blocks 340, and the de-scrambler 270 is implemented in the ETC blocks 370.

The implementation of the current management invention complements the design of switches and other devices that require fanout of data to large numbers of destinations. The disclosed technique reduces the complexity and cost of power supplies circuits by eliminating cycle to cycle current demand variations and reduces the impact that such variations can have on sensitive circuits within the systems.

In summary, embodiments of the present invention provide methods and apparatus for reducing current demand variations in large fanout trees. The fanout tree is split into 2 sub-groups, each with substantially equal parasitic capacitance. Data is then scrambled in such a way that guarantees the two sub-trees toggle so that they complement each other. Scrambling the data going to Left and Right sub-groups with the sequences in Equation 1 and Equation 2 is one of the simplest implementations possible. However, these are just examples. Any sequence pair that satisfies Equation 7 would work. There is little reason to generate alternative sequences from Equation 7.

Embodiments of the present invention have been described in relation to 8-bit bytes. Embodiments of the present invention are also applicable to any bus width, from 1 to N. While there are some benefits to splitting the fanout tree into groups (each having 2 sub-groups), this is only a preferred embodiment in certain circumstances.

Functionally, an apparatus according to an embodiment of the present invention includes 3 blocks; a scrambler, egress logic, and a de-scrambler. The egress logic is simply a block of storage. What makes this block of storage special is that it can reorder the bytes received from the scrambler. In order for the de-scrambler to know what mask in the scrambling sequence to use, it needs to know what mask was used on that byte initially. This is the purpose of the TSLSB signal in the egress logic. Essentially, the egress logic transfers the identity of the scrambling sequence mask to the de-scrambler. Also note that if there is no re-ordering of the data, there would be no need to transfer the scrambling mask ID. The de-scrambler can deduce that implicitly from the frame pulse.

With respect to the selection of groups, a destination (or egress port) may change its group and sub-group membership over time.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A data transmission apparatus having ingress and egress ports, and comprising:
a scrambler to split a fanout of ingress data, from each ingress port to the egress ports, into a first sub-group and a second sub-group and to scramble the first and second sub-groups according to a scrambling sequence function to provide a combined scrambled output of the first and second sub-groups having a constant number of toggled bits with respect to time, wherein the first and second sub-groups carry same data prior to being scrambled.

2. The data transmission apparatus of claim 1 wherein the first and second sub-groups have substantially equal parasitic capacitance.

3. The data transmission apparatus of claim 1 wherein the scrambling sequence function includes first and second scrambling patterns to scramble the first and second sub-groups, respectively.

4. The data transmission apparatus of claim 3 wherein the ingress data is time division multiplexed (TDM) data, and the first and second scrambling patterns each have a bit width equal to a grain bit width of the ingress data.

5. The data transmission apparatus of claim 3 wherein the first and second scrambling patterns each have a length of 2 scrambling elements.

6. The data transmission apparatus of claim 1 wherein the constant number of toggled bits is equal to half the number of sub-groups.

7. The data transmission apparatus of claim 1 wherein the scrambler further comprises ingress port logic to split the ingress data into a plurality of groups, a first group including the first and second sub-groups, and a second group including third and fourth sub-groups, the scrambler to scramble the third and fourth sub-groups according to a second scrambling sequence function to provide a combined scrambled output of the third and fourth sub-groups having a second constant number of toggled bits with respect to time.

8. The data transmission apparatus of claim 7 wherein the third and fourth sub-groups have substantially equal parasitic capacitance.

9. The data transmission apparatus of claim 1 wherein the scrambler scrambles the first and second sub-groups according to the scrambling sequence function so that the constant number of toggled bits is independent of the ingress data.

10. The data transmission apparatus of claim 1 wherein the scrambler scrambles the first and second sub-groups according to the scrambling sequence function to provide a first sub-group scrambled output and a second sub-group scrambled output.

11. The data transmission apparatus of claim 10 wherein the scrambler further comprises a counter to count timeslots in the ingress data, and a plurality of XOR gates to scramble the ingress data in response to an output of the counter, to provide the first and second sub-group scrambled outputs.

12. The data transmission apparatus of claim 10 wherein the scrambler further comprises first and second sub-group interleavers to provide the first and second sub-group scrambled outputs, respectively.

13. The data transmission apparatus of claim 1 further comprising: egress logic to receive and retransmit scrambled data received from the scrambler.

14. The data transmission apparatus of claim 13 wherein the egress logic comprises first and second sub-group egress selection switches to receive and retransmit first and second sub-group scrambled outputs, respectively, from the scrambler.

15. The data transmission apparatus of claim 13 wherein the egress logic retransmits scrambled data such that it reorders the scrambled data.

16. The data transmission apparatus of claim 13 wherein the egress logic retransmits scrambled data such that it changes the timing of the scrambled data and transfers an identifier of the scrambling sequence function.

17. The data transmission apparatus of claim 1 further comprising: a de-scrambler to receive scrambled data, and to de-scramble the scrambled data based on the scrambling sequence function.

18. The data transmission apparatus of claim 17 wherein the de-scrambler comprises a first sub-group descrambler and a second sub-group descrambler, to de-scramble the first sub-group and second sub-group, respectively.

19. The data transmission apparatus of claim 17 wherein the de-scrambler de-scrambles the scrambled data based on a scrambling sequence function identifier.

20. The data transmission apparatus of claim 19 wherein scrambling sequence function identifier is an ingress timeslot number, an egress group number, or a sub-group identifier.

21. The data transmission apparatus of claim 17 wherein the de-scrambler selectively de-scrambles the first-sub group and the second sub-group of an egress port group in response to a configuration signal.

22. The data transmission apparatus of claim 17 wherein the de-scrambler comprises a first AND gate coupled to first XOR gates to de-scramble the first sub-group, and a second AND gate coupled to second XOR gates to de-scramble the second sub-group.

23. The data transmission apparatus of claim 17 wherein the de-scrambler comprises a counter to determine the scrambling sequence function.

24. The data transmission apparatus of claim 1 wherein the data transmission apparatus is a memory switch.

25. A computer-implemented method of transmitting data in a data transmission apparatus having ingress and egress ports, comprising:
splitting a fanout of ingress data, from each ingress port to the egress ports, into a first sub-group and a second sub-group; and
scrambling the first and second sub-groups according to a scrambling sequence function into first and second scrambled data, respectively, the first and second scrambled data, when considered together, having a constant number of bits that are toggled with respect to time, wherein the first and second sub-groups carry same data prior to being scrambled.

26. The computer-implemented method of claim 25 wherein the first and second sub-groups have substantially equal parasitic capacitance.

27. The computer-implemented method of claim 25 wherein the step of scrambling the first and second sub-groups according to the scrambling sequence function includes scrambling the first and second sub-groups according to first and second scrambling patterns, respectively.

28. The computer-implemented method of claim 27 wherein the first and second scrambling patterns each have a bit width equal to a grain bit width of the ingress data, when the ingress data is time division multiplexed (TDM) data.

29. The computer-implemented method of claim 27 wherein the first and second scrambling patterns each have a length of 2 scrambling elements.

30. The computer-implemented method of claim 25 wherein the constant number of toggled bits is equal to half the number of sub-groups.

31. The computer-implemented method of claim 25 wherein the step of splitting the fanout of ingress data includes splitting the ingress data into a plurality of groups, a first group including the first and second sub-groups, and a second group including third and fourth sub-groups, and further comprising the step of scrambling the third and fourth sub-groups according to a second scrambling sequence function to provide a combined scrambled output of the third and fourth sub-groups having a second constant number of toggled bits with respect to time.

32. The computer-implemented The method of claim 31 wherein the third and fourth sub-groups having substantially equal parasitic capacitance.

33. The computer-implemented method of claim 25 wherein the constant number of bits that are toggled with respect to time is independent of the ingress data.

34. The computer-implemented method of claim 25 wherein the step of scrambling the first and second sub-groups according to the scrambling sequence function provides a first sub-group scrambled output and a second sub-group scrambled output.

35. The computer-implemented method of claim 25 further comprising the step of de-scrambling the retransmitted data based on the scrambling sequence function.

36. A scrambler circuit for use with a data transmission apparatus having ingress and egress ports, the scrambler comprising:

ingress logic to split a fanout of ingress data, from each ingress port to the egress ports, into a first sub-group and a second sub-group; and scrambling logic to scramble the first and second sub-groups according to a scrambling sequence function to provide a combined scrambled output of the first and second sub-groups having a constant number of bits that are toggled with respect to time, wherein the first and second sub-groups carry same data prior to being scrambled.

\* \* \* \* \*

UNITED STATES PATENT AND TRADEMARK OFFICE
CERTIFICATE OF CORRECTION

PATENT NO.      : 7,668,210 B1  Page 1 of 1
APPLICATION NO. : 10/830031
DATED           : February 23, 2010
INVENTOR(S)     : Mok et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1706 days.

Signed and Sealed this

Seventh Day of December, 2010

David J. Kappos
*Director of the United States Patent and Trademark Office*